United States Patent
Chou et al.

(10) Patent No.: US 9,961,338 B2
(45) Date of Patent: May 1, 2018

(54) METHOD AND APPARATUS FOR REDUCING FIXED PATTERN NOISE OF IMAGE SENSOR IN DIGITAL DOMAIN

(71) Applicant: PixArt Imaging Inc., Hsin-Chu (TW)

(72) Inventors: Chien-Jung Chou, Hsin-Chu (TW); Mei-Chao Yeh, Hsin-Chu (TW); Wen-Cheng Yen, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 86 days.

(21) Appl. No.: 15/051,678

(22) Filed: Feb. 24, 2016

(65) Prior Publication Data
US 2017/0026596 A1    Jan. 26, 2017

(30) Foreign Application Priority Data
Jul. 21, 2015   (TW) .............................. 104123481 A

(51) Int. Cl.
| | | |
|---|---|---|
| *H04N 5/217* | (2011.01) | |
| *H04N 17/00* | (2006.01) | |
| *H04N 5/365* | (2011.01) | |
| *H04N 5/3745* | (2011.01) | |

(52) U.S. Cl.
CPC ......... *H04N 17/002* (2013.01); *H04N 5/3655* (2013.01); *H04N 5/3658* (2013.01); *H04N 5/3745* (2013.01)

(58) Field of Classification Search
CPC .... H04N 5/3675; H04N 5/365; H04N 5/3658; H04N 5/3655; H04N 5/2176; H04N 5/361

USPC ....... 348/175, 180, 187, 181, 188, 193, 135, 348/216.1, 230.1, 236, 238, 241, 272, 348/294, 308, 340, 350, 371, 470, 533, 348/535, 589, 606, 607, 618, 620, 627, 348/683, 701, 243, 244, 245, 246, 247; 351/200, 227
See application file for complete search history.

(56) References Cited

U.S. PATENT DOCUMENTS

| | | | | |
|---|---|---|---|---|
| 6,879,344 B1* | 4/2005 | Nakamura | ........... | H04N 5/2351 348/221.1 |
| 7,857,450 B1* | 12/2010 | Hofeldt | .................. | A61B 3/022 351/233 |
| 2003/0122843 A1* | 7/2003 | Lai | ........................... | H04N 1/46 345/589 |
| 2003/0151682 A1* | 8/2003 | Kokubo | ............... | H04N 5/3675 348/241 |
| 2006/0038916 A1* | 2/2006 | Knoedgen | .............. | H04N 17/00 348/371 |
| 2007/0242002 A1* | 10/2007 | Kawabe | ............... | G09G 3/3233 345/76 |
| 2008/0158396 A1* | 7/2008 | Fainstain | ............... | H04N 5/361 348/246 |

(Continued)

*Primary Examiner* — Brian Yenke
*Assistant Examiner* — Mustafizur Rahman
(74) *Attorney, Agent, or Firm* — Winston Hsu

(57) ABSTRACT

A method for reducing fixed pattern noise of an image sensor is provided. The method includes: accessing pixel data of at least one test frame in a test environment; and calculating/deriving average values of each column based on at least one portion of pixel data of the column in the at least one test frame, wherein the average values of columns are used as calibration values for calibrating image pixel data of columns when the image sensor operates in a normal light source environment.

10 Claims, 2 Drawing Sheets

(56) References Cited

U.S. PATENT DOCUMENTS

| | | | |
|---|---|---|---|
| 2008/0291290 A1* | 11/2008 | Sonoda | H04N 5/361 348/222.1 |
| 2009/0180687 A1* | 7/2009 | Zhu | G06T 3/4015 382/167 |
| 2009/0278962 A1* | 11/2009 | Richardson | H04N 5/335 348/241 |
| 2010/0053383 A1* | 3/2010 | Ichikawa | H04N 5/3675 348/247 |
| 2010/0149386 A1* | 6/2010 | Wright | H04N 5/3675 348/246 |
| 2011/0090242 A1* | 4/2011 | Cote | H04N 9/045 345/597 |
| 2011/0267513 A1* | 11/2011 | Sonoda | H04N 5/361 348/294 |
| 2011/0315853 A1* | 12/2011 | Cho | H01L 27/14605 250/208.1 |
| 2012/0013780 A1* | 1/2012 | Mo | H04N 5/347 348/308 |
| 2012/0092533 A1* | 4/2012 | Komori | H04N 5/367 348/251 |
| 2012/0197461 A1* | 8/2012 | Barrows | G06T 7/2013 701/1 |
| 2013/0070089 A1* | 3/2013 | Kawasaki | G06F 3/0428 348/135 |
| 2014/0016005 A1* | 1/2014 | Kishima | H04N 5/2176 348/246 |
| 2014/0139706 A1* | 5/2014 | Jang | H04N 9/045 348/241 |
| 2014/0152844 A1* | 6/2014 | Jiang | H04N 17/002 348/187 |
| 2014/0313378 A1* | 10/2014 | Yuen | H04N 5/365 348/272 |
| 2015/0100530 A1* | 4/2015 | Mnih | G06N 3/0454 706/25 |

* cited by examiner

METHOD AND APPARATUS FOR REDUCING FIXED PATTERN NOISE OF IMAGE SENSOR IN DIGITAL DOMAIN

BACKGROUND OF THE INVENTION

1. Field of the Invention

The present invention relates to a noise cancellation mechanism in an image sensing field, and more particularly, to a method and an apparatus for reducing fixed pattern noise of an image sensor.

2. Description of the Prior Art

Generally speaking, non-ideal effects of analog circuits exist in a traditional image sensor to make noise commonly appear on an image sensing frame. For example, the noise caused by non-ideal effects of analog circuits may include fixed pattern noise appearing on a frame, that is, vertical stripe phenomenon appearing on a sensing frame. Because a traditional sensor array may have different extents of leakage currents in different column-line circuits, inconsistent signal characteristics appear on different column-line circuits, and consequently, vertical stripe phenomenon appears on a final sensing frame. In addition, the stray capacitance in a traditional image sensor may easily make each column-line circuit suffer from interference when analog signals are switching, and thus may create inconsistent signal characteristics for different column-line circuit, which is one of the contributors to the fixed pattern noise. Moreover, there is other noise (e.g. random noise) existing in the analog circuits of a traditional image sensor that affects image sensing frames. In order to reduce the noise caused by non-ideal effects of analog circuits, the existing techniques usually implement a noise cancellation circuit in an analog domain to reduce noise. However, these kinds of circuit designs are over-complicated, and the costs of these kinds of circuits are also higher.

SUMMARY OF THE INVENTION

Therefore, one of the objectives of the present invention is providing a method and an apparatus for adjusting pixel values in a digital domain to reduce/cancel fixed pattern noise of an image sensor and solve the aforementioned issues.

According to an embodiment of the present invention, a method for reducing fixed pattern noise of an image sensor is disclosed. The method includes: accessing pixel data of at least one test frame in a test environment; and calculating an average value of each column based on at least one portion of pixel data of the at least one test frame; wherein the average value of each column is used as a calibration value for calibrating image data of each column in a normal light source environment to reduce fixed pattern noise of the image sensor.

According to an embodiment of the present invention, an apparatus used in an image sensor for reducing fixed pattern noise is disclosed. The apparatus includes a storage circuit and a control circuit. The storage circuit is provided with a lookup table, and the lookup table stores an average value calculated for each column based on at least one portion of pixel data of at least one test frame in a test environment; and the control circuit, coupled to the storage circuit, is arranged to access the average value of each column, and use the average value of each column to adjust the image data of each column to reduce fixed pattern noise of the image sensor in a normal light source environment.

According to an embodiment of the present invention, an apparatus used in an image sensor for reducing fixed pattern noise is disclosed. The apparatus includes a storage circuit and a control circuit. The control circuit is coupled to the storage circuit and is arranged in a test environment to access pixel data of the at least one test frame, calculate an average value of each column based on at least one portion of pixel data of the at least one test frame, store the average value of each column in the lookup table; and the control circuit is arranged in a normal light source environment to access the lookup table to obtain the average value of each column, use the average value of each column to adjust image data of each column to reduce fixed pattern noise of the image sensor.

According to an embodiment of the present invention, the mechanism and method of the present invention generate calibration values in a test environment for calibrating the noise caused by non-ideal effects of analog circuits and subtract calibration values from pixel values of normal sensing frames in a digital domain to reduce/cancel the noise caused by non-ideal effects of analog circuits in normal sensing frames. The advantages of the proposed mechanism and method include avoiding spending too much signal processing time on noise cancellation in an analog domain and avoiding high production costs of circuits. In addition, the present invention may be applicable to different image sensors, such as image sensors in security surveillance field or image sensors in other technology fields (e.g. fields of projection sensing, mouse sensing, fingerprint sensing etc.).

These and other objectives of the present invention will no doubt become obvious to those of ordinary skill in the art after reading the following detailed description of the preferred embodiment that is illustrated in the various figures and drawings.

DETAILED DESCRIPTION

Figure 1:
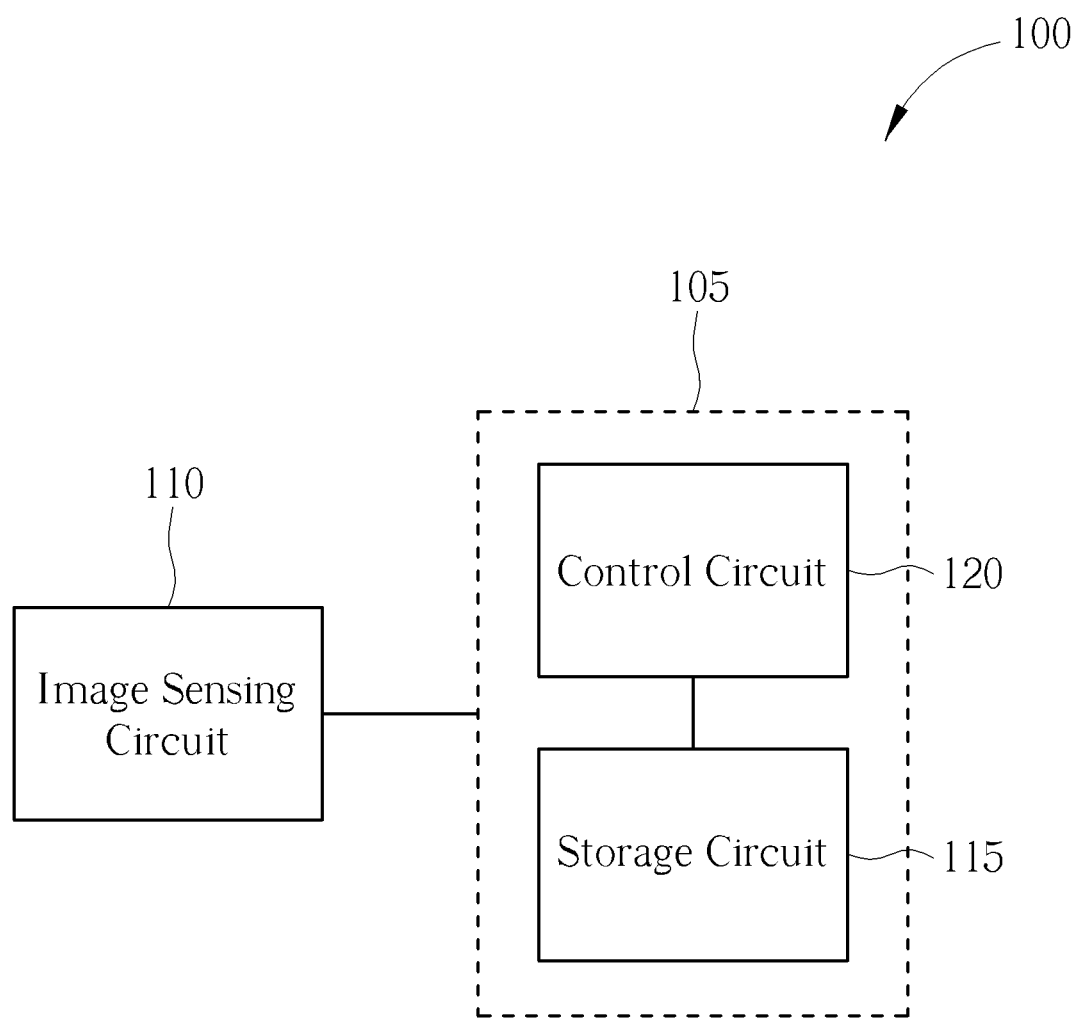
FIG. 1 is a block diagram of an apparatus used in an image sensor for adjusting the noise caused by non-ideal effects of analog circuits according to an embodiment of the invention.
Figure 2:
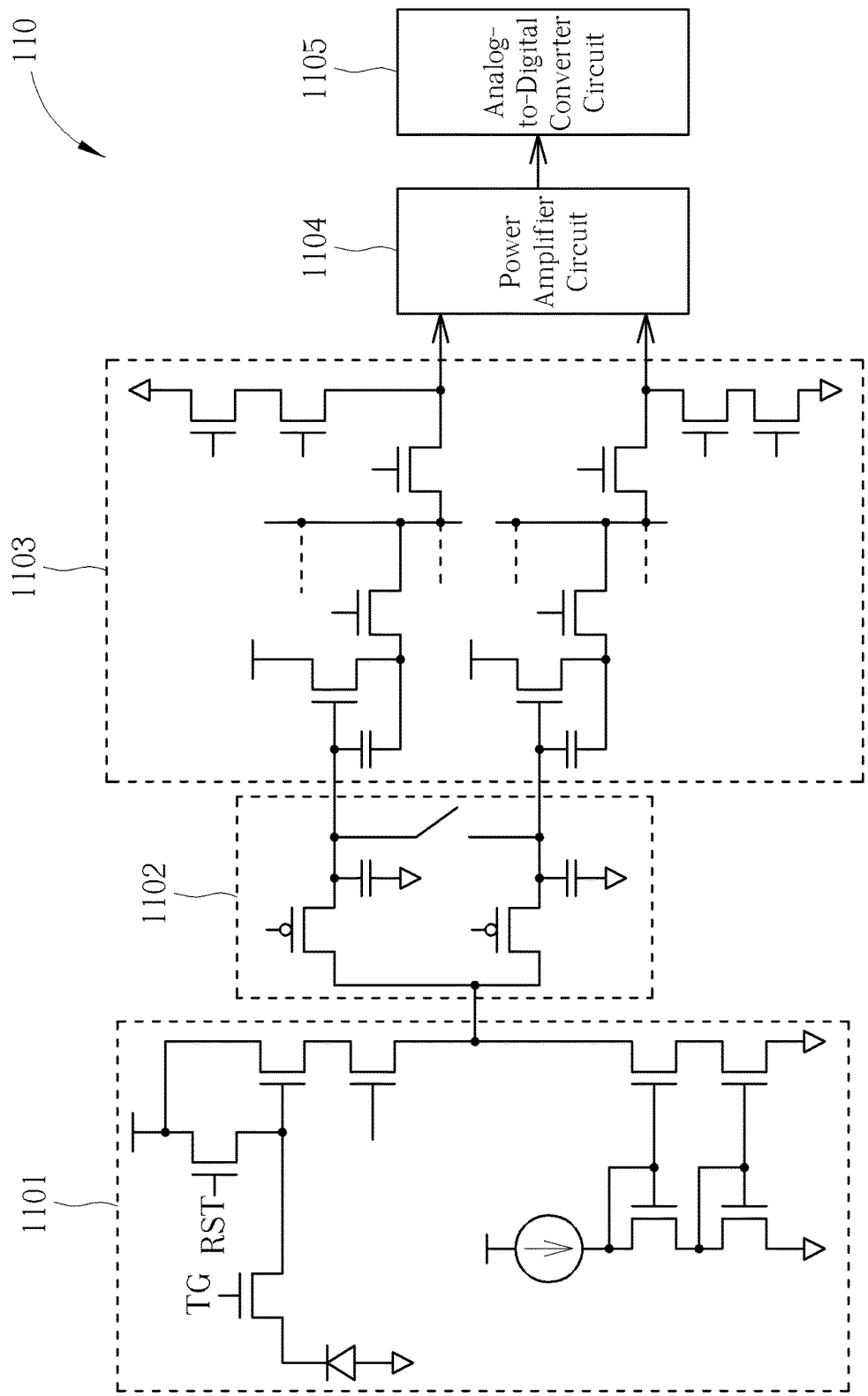
FIG. 2 is a circuit diagram of an example of the image sensor circuit illustrated in FIG. 1.

Please refer to FIG. 1 in conjunction with FIG. 2. FIG. 1 is a block diagram showing an apparatus 105 used in an image sensor 100 for adjusting the noise caused by non-ideal effects of analog circuits according to an embodiment of the present invention. The image sensor 100 includes an image sensing circuit 110 and an apparatus 105 arranged to adjust the noise of pixel data. FIG. 2 is a circuit diagram of an example of the image sensing circuit 110 illustrated in FIG. 1. The apparatus 105 may be regarded as an adjustment apparatus/circuit including a storage circuit 115 and a control circuit 120. In addition, the image sensing circuit 110 includes a sensing pixel array 1101, a correlated double sampling (CDS) circuit 1102, a source follower circuit 1103, a power amplifier circuit 1104 and an analog-to-digital converter (ADC) circuit 1105. It should be noted that the image sensing circuit 110 may be realized by using other different types of image sensing circuits. The circuit elements included in the image sensing circuit 110 are only for describing the operation of the image sensor 100, and are not meant to be limitations of the present invention. As far as operation is concerned, the image sensing circuit 110 is an analog circuit arranged to perform the operations of optical sensing, analog processing and analog-to-digital conversion to generate and output pixel data of multiple frames; and the apparatus 105 is arranged to adjust the noise of the pixel data of the multiple frames by applying adjustment to values of the pixel data in a digital domain to reduce the noise that results from the non-ideal effects of analog circuits and appears on the frames generated by the image sensor 100. For example, the vertical stripe phenomenon (i.e. fixed pattern noise) appearing on image frames can be reduced to improve the image quality. In addition, adjusting the values of pixel data via an adjustment in the digital domain may also effectively reduce the random noise of the image frames and save the time of performing noise cancellation in the analog domain. The storage circuit 115 includes a lookup table arranged to store the values of pixel data of the multiple frames and the values generated by performing calculations upon the pixel data. The control circuit 120 is coupled to the storage circuit 115. In a test environment, the control circuit 120 is arranged to control the turn-on of the image sensing circuit 110 to sense and generate pixel data of at least one test frame, access pixel data of the at least one test frame, calculate an average value of each column based on the at least one portion of pixel data of at least one test frame, store the average value of each column in the lookup table of the storage circuit 115, and access the lookup table to obtain the average value of each column. In a normal light source environment, the control circuit 120 is arranged to use the average value of each column to adjust image data of each column to reduce the noise that results from the non-ideal effects of analog circuits and appears on the frames generated by the image sensor 100. For example, the vertical stripe phenomenon appearing on image frames can be cancelled. That is to say, in the aforementioned embodiment, the apparatus 105 has at least two modes. In a test environment (i.e. in a test mode), an average value of at least one portion of pixel data in each column or an average value of all pixel data in each column is calculated, and average values of different columns are stored in the lookup table as calibration values later used for reducing fixed pattern noise. Afterward, in a normal light source environment (i.e. in a normal use mode), the average values are used to adjust pixel values of different columns, respectively, to thereby reduce fixed pattern noise of the whole frame.

In the first embodiment, an operation of generating calibration values used for adjusting the noise caused by non-ideal effects of analog circuits before the integrated circuit chip of image sensor 100 leaves the factory. In the test environment, the image sensor 100 is blocked from receiving incident light; the control circuit 120 of the apparatus 105 is arranged to control the turn-on of the image sensing circuit 110 to sense and generate pixel data of at least one sensing frame; the image sensing circuit 110 performs operations of optical sensing, analog processing and analog-to-digital conversion to generate pixel data of multiple sensing frames, where these sensing frames may be regarded as test frames or light-blocked frames due to being generated in a test light-blocked environment; and afterward the control circuit 120 accesses pixel data of the at least one test frame, and calculates an average value of each column based on at least one portion of pixel data of the at least one test frame, and stores the average value of each column in the lookup table of the storage circuit 115. Specifically, in the test environment, the control circuit 120 accesses pixel data of one or more test frames, and calculates an average value of at least one portion (i.e., part of all) of pixel data in each column of one or more test frames. That is, an average value is calculated for each column and then stored in the lookup table of the storage circuit 115. If the image sensor 100 is entirely blocked from receiving incident light, then an average value of each column can be calculated based on all pixel data of the column in one or more test frames. If there are multiple test frames, then an accumulation is performed for a same column in the test frames based on at least one portion of pixel data of the same column, and an average calculation is performed according to an accumulation result to generate an average value of the column. The advantage of such calculation is that an average value of each column can be precisely calculated, thereby precisely obtaining a calibration value used for adjusting the noise caused by non-effects of analog circuits. Conversely, if the image sensor 100 is not entirely blocked from receiving incident light, then an average value of each column can be calculated based on pixel data of pixels of the column that are inside a light-blocked zone of one or more test frames. The advantage of such calculation is that an average value of each column can be quickly calculated to save test time. In practice, with regard to calculating an average value of each column based on multiple test frames, a pixel average value of each column in each test frame may be first calculated, and then multiple pixel average values of the same column in different test frames are averaged to obtain a pixel average value of each column. The aforementioned pixel average value of each column is used as a calibration value for calibrating the noise caused by non-ideal effects of analog circuits and appearing on each column of a frame. When the image sensor 100 is in a normal light source environment, the image sensing circuit 110 performs operations of optical sensing, analog processing and analog-to-digital conversion to generate pixel data of multiple normal sensing frames; and the control circuit 120 accesses the data in the aforementioned lookup table, and the average values of columns are used to respectively adjust the image data of different columns in one or multiple normal sensing frames, thereby reducing the noise caused by non-ideal effects of analog circuits. For example, the fixed pattern noise of the image sensor 100 (which generates vertical stripe phenomenon on image frames) can be reduced. In addition, if random noise exists in frames, the random noise can be effectively cancelled via the aforementioned mechanism.

Furthermore, in a second embodiment, there is no need to perform light-blocking before the integrated circuit chip of the image sensor 100 leaves the factory. In a test environment of the second embodiment, the apparatus 105 turns off the sensing functions of the image sensor 100 for sensing at least one portion of pixel data of each column in a frame. For example, when entering the test environment, the control circuit 120 turns off the sensing functions of all pixels or one portion of pixels of each column in the image sensing circuit 110 (it should be noted that turning off sensing functions of pixel is not equal to blocking pixels from receiving incident light). As illustrated in FIG. 2, the control circuit 102 is arranged to turn off control signal TG or turn on the signal RST, such that there is no sensing data that can pass through the correlated double sampling circuit 1102, source follower circuit 1103, power amplifier circuit 1104 and analog-to-digital converter circuit 1105. At this moment, there is no sensing data actually passing through the aforementioned circuits in a test environment. However, because the aforementioned circuits elements are still turned on, data may still be collected to generate and output data of sensing frames, where the data of sensing frames generated and output at this moment may be regarded as test frames. The control circuit 120 of the apparatus 105 accesses pixel data of at least one test frame, and calculates an average value of each column based on at least one portion of pixel data of the column in the at least one test frame, and stores the average value of each column in the lookup table of the storage circuit 115. Specifically, in this test environment, the control circuit 120 accesses pixel data of one or multiple test frames, and calculates an average value of each column based on at least one portion (i.e., part or all) of pixel data of the column in one or multiple test frames. That is, an average value for each column is calculated and then stored in the lookup table of the storage circuit 115. If the sensing functions of the image sensor 100 for all pixels of each column in a frame are turned off, then an average value of each column can be calculated based on all pixel data of the column in one or more test frames, and the advantage of such calculation is that an average value of each column can be precisely calculated. Conversely, if the sensing functions of the image sensor 100 for only one portion of pixels of each column in a frame are turned off, then an average value of each column can be calculated based on one portion of pixel data of the column in one or more test frames, and the advantage of such calculation is that an average value of each column can be quickly calculated. In practice, with regard to calculating an average value of each column based on multiple test frames, a pixel average value of each column in each test frame may be first calculated, and then the multiple pixel average values of the same column in different test frames are averaged to obtain a pixel average value of each column. The aforementioned pixel average value of each column is used as a calibration value for calibrating the noise caused by non-ideal effects of analog circuits and appearing on each column of a frame. When the image sensor 100 is in a normal light source environment, the image sensing circuit 110 performs the operations of optical sensing, analog processing and analog-to-digital conversion to generate pixel data of multiple normal sensing frames; and the control circuit 120 accesses the data of the aforementioned lookup table, and uses the average value of columns to respectively adjust the image data of different columns in multiple normal sensing frames, thereby reducing the noise caused by non-ideal effects of analog circuits. For example, the fixed pattern noise of the image sensor 100 (which generates vertical stripe phenomenon on image frames) can be reduced. In addition, if random noise exists in frames, the random noise may be effectively cancelled via the aforementioned mechanism.

Moreover, in a third embodiment, the aforementioned calibration values may be obtained for an image frame with a different magnification factor by using linear interpolation calculation without performing testing in a test environment. In this way, the test time can be saved. For example, in a test environment, the control circuit 120 accesses at least one test frame according to a first magnification factor (e.g. 32 times), and the control circuit 120 calculates a first average value of each column based on at least one portion of pixel data of the column in the at least one test frame. When the image sensor 100 operates in a normal light source environment and with the first image magnification factor, the first average value of each column is used as a calibration value for calibrating image data of the column to reduce the noise caused by non-effects in analog circuits. In addition, the control circuit 120 uses the calculated first average value of each column to interpolate a second average value of each column according to a ratio between the first image magnification factor and a second image magnification factor (e.g. 1 time). When the image sensor 100 operates in the normal light source environment and with the second image magnification factor, the second average value of each column is used as a calibration value for calibrating image data of each column to reduce the noise caused by non-effects in analog circuits. That is to say, the lookup table of the storage circuit 115 only needs to store a calibration value of each column related to an image magnification factor being 32 times, and afterward, when the image sensor 100 operates with an image magnification factor being 1 time (or other image magnification factor), a calibration value of each column related to the image magnification factor being 1 time (or other image magnification factor) may be obtained by using linear interpolation. In this way, the lookup table only needs to store the calibration values used for calibrating noise related to only a single image magnification factor. There is no need to sense, generate or calculate test frames with all image magnification factors in a test environment. The test time is therefore saved. Furthermore, in a preferred embodiment, the aforementioned first image magnification factor may be set to be the maximum magnification factor (e.g. 32 times). Alternative, the aforementioned first image magnification factor may be set by a different magnification factor. The maximum magnification factor adopted in this embodiment is not a limitation of the present invention.

Moreover, it should be noted that, in the aforementioned embodiments of the present invention, the method and mechanism of generating the calibration values in a test environment and reducing/cancelling the noise caused by non-ideal effects of analog circuits by subtracting calibration values from pixel values of a normal sensing frame in the digital domain are applicable to different image sensors, such as image sensors in security surveillance field or image sensors in other technology fields (e.g. fields of projection sensing, mouse sensing, fingerprint sensing etc.). In addition, the aforementioned method and mechanism are also applicable to image sensors that need to display sensing frames and image sensors that do not need to display sensing frames. Moreover, the aforementioned operations of generating calibration values may be executed on every booting in case different calibration values may be needed under different operation environments. Moreover, the embodiments of the present invention are arranged to reduce/cancel fixed pattern noise on frames; however, in other embodiments, the proposed design may also effectively cancel the unusual situations of image frames caused by other different reasons, and is not limited to only dealing with the problem of fixed pattern noise on frames.

In addition, in the aforementioned embodiments of the present invention, the control circuit 120 possesses an operation of generating calibration values of pixel data (i.e. pixel average value of each column described above) in a test environment for cancelling fixed pattern noise, and possesses an operation of using the calibration values for adjusting the pixel data of normal sensing frames in a normal sensing environment. In other embodiments, if the calibration values are already generated and stored in the storage circuit 115, then the control circuit 120 may only possess an operation of using the calibration values for adjusting the pixel data of normal sensing frames in a normal sensing environment, which is also conformed to the spirit of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for reducing fixed pattern noise of an image sensor comprising:

entering a test environment by turning off sensing functions of pixels of the image sensor that correspond to at least one portion of pixel data of each column in at least one test frame without blocking the pixels of the image sensor from receiving incident light;

accessing the pixel data of the at least one test frame generated in the test environment; and calculating an average value of said each column based on the at least one portion of pixel data of said each column in the at least one test frame; wherein the average value of said each column is used as a calibration value for calibrating image data of said each column in a normal light source environment to reduce the fixed pattern noise of the image sensor; the sensing functions are turned on in the normal light source environment;

calculating a first average value of said each column based on the at least one portion of pixel data of said each column in the at least one test frame according to the first image magnification factor, wherein when the image sensor operates in a normal light source environment and with the first image magnification factor, the first average value of said each column is used as a calibration value for calibrating image data of said each column to reduce the fixed pattern noise of the image sensor; and using the calculated first average value of said each column for interpolating a second average value of said each column according to a ratio between the first image magnification factor and a second image magnification factor, wherein when the image sensor operates in the normal light source environment and with the second image magnification factor, the second average value of said each column is used as a calibration value for calibrating image data of said each column to reduce the fixed pattern noise of the image sensor; wherein the first image magnification factor is different from the second image magnification factor.

2. The method of claim 1, wherein the step of accessing pixel data of the at least one test frame comprises:

accessing pixel data of a plurality of test frames; and the step of calculating the average value of said each column based on the at least one portion of pixel data of said each column in the at least one test frame comprises:

for said each column, performing an accumulation based on at least one portion of pixel data of said each column in each of the plurality of test frames, and generating the average value by performing an average calculation according to an accumulation result.

3. The method of claim 1, wherein the step of calculating the average value of said each column based on the at least one portion of pixel data of said each column in the at least one test frame comprises:

generating the average value of said each column by calculating pixel data of pixels of said each column that are inside a light-blocked zone of the at least one test frame.

4. The method of claim 1, further comprising:

in the normal light source environment, using the average value of said each column to adjust image data of said each column to reduce the fixed pattern noise of the image sensor.

5. An apparatus used in an image sensor for reducing fixed pattern noise comprising:

a storage circuit, having a lookup table arranged to store an average value calculated for each column based on at least one portion of pixel data of said each column in at least one test frame generated in a test environment; and a control circuit, coupled to the storage circuit, the control circuit arranged to access the average value of said each column in the lookup table, and use the average value of said each column to adjust image data of said each column to reduce the fixed pattern noise of the image sensor in a normal light source environment;

wherein, in the test environment sensing functions of pixels of the image sensor that correspond to the at least one portion of pixel data of said each column in the at least one test frame are turned off, and the pixels of the image sensor are not blocked from receiving incident light; and, in the normal light source environment, the sensing functions of the pixels are turned on;

wherein the control circuit accesses the at least one test frame according to a first image magnification factor; the control circuit calculates a first average value of said each column based on the at least one portion of pixel data of said each column in the at least one test frame according to the first image magnification factor, wherein when the image sensor operates in a normal light source environment and with the first image magnification factor, the first average value of said each column is used as a calibration value for calibrating image data of said each column to reduce the fixed pattern noise of the image sensor; and the control circuit uses the calculated first average value of said each column for interpolating a second average value of said each column according to a ratio between the first image magnification factor and a second image magnification factor, wherein when the image sensor operates in the normal light source environment and with the second image magnification factor, the second average value of said each column is used as a calibration value for calibrating image data of said each column to reduce the fixed pattern noise of the image sensor; wherein the first image magnification factor is different from the second image magnification factor.

6. The apparatus of claim 5, wherein the control circuit is operated in the test environment to access pixel data of the at least one test frame, calculate the average value of said each column based on the at least one portion of pixel data of said each column in the at least one test frame, and store the average value of said each column in the lookup table.

7. The apparatus of claim 6, wherein the control circuit accesses pixel data of a plurality of test frames in the test environment; and for said each column, the control circuit performs an accumulation based on at least one portion of pixel data of said each column in each of the plurality of test frames, and generates the average value by performing an average calculation according to an accumulation result.

8. The apparatus of claim 6, wherein the control circuit generates the average value by calculating pixel data of pixels of said each column that are inside a light-blocked zone of the at least one test frame.

9. A method for reducing fixed pattern noise of an image sensor comprising:

accessing pixel data of at least one test frame in a test environment;

and calculating an average value of each column based on at least one portion of pixel data of said each column in the at least one test frame;

wherein the average value of said each column is used as a calibration value for calibrating image data of said each column in a normal light source environment to reduce the fixed pattern noise of the image sensor; accessing the at least one test frame is performed according to a first image magnification factor, and the step of calculating the average value of said each column based on the at least one portion of pixel data of said each column in the at least one test frame comprises:

calculating a first average value of said each column based on the at least one portion of pixel data of said each column in the at least one test frame according to the first image magnification factor, wherein when the image sensor operates in a normal light source environment and with the first image magnification factor, the first average value of said each column is used as a calibration value for calibrating image data of said each column to reduce the fixed pattern noise of the image sensor; and using the calculated first average value of said each column for interpolating a second average value of said each column according to a ratio between the first image magnification factor and a second image magnification factor, wherein when the image sensor operates in the normal light source environment and with the second image magnification factor, the second average value of said each column is used as a calibration value for calibrating image data of said each column to reduce the fixed pattern noise of the image sensor; wherein the first image magnification factor is different from the second image magnification factor.

10. An apparatus used in an image sensor for reducing fixed pattern noise comprising:

a storage circuit, having a lookup table arranged to store an average value calculated for each column based on at least one portion of pixel data of said each column in at least one test frame in a test environment; and a control circuit, coupled to the storage circuit, the control circuit arranged to access the average value of said each column in the lookup table, and use the average value of said each column to adjust image data of said each column to reduce the fixed pattern noise of the image sensor in a normal light source environment;

wherein the control circuit is operated in the test environment to access pixel data of the at least one test frame, calculate the average value of said each column based on the at least one portion of pixel data of said each column in the at least one test frame, and store the average value of said each column in the lookup table; the control circuit accesses the at least one test frame according to a first image magnification factor; the control circuit calculates a first average value of said each column based on the at least one portion of pixel data of said each column in the at least one test frame according to the first image magnification factor, wherein when the image sensor operates in a normal light source environment and with the first image magnification factor, the first average value of said each column is used as a calibration value for calibrating image data of said each column to reduce the fixed pattern noise of the image sensor; and the control circuit uses the calculated first average value of said each column for interpolating a second average value of said each column according to a ratio between the first image magnification factor and a second image magnification factor, wherein when the image sensor operates in the normal light source environment and with the second image magnification factor, the second average value of said each column is used as a calibration value for calibrating image data of said each column to reduce the fixed pattern noise of the image sensor; wherein the first image magnification factor is different from the second image magnification factor.

* * * * *